G. B. LEWIS.
Milk Rack.

No. 26,688.

Patented Jan'y 3, 1860.

WITNESSES
P. H. Mitchell
John Thompson.

INVENTOR
George B. Lewis

UNITED STATES PATENT OFFICE.

GEORGE B. LEWIS, OF MOREAU STATION, NEW YORK.

MILK-PAN RACK.

Specification of Letters Patent No. 26,688, dated January 3, 1860.

*To all whom it may concern:*

Be it known that I, GEORGE B. LEWIS, of Moreau Station, in the county of Saratoga and State of New York, have invented a new and Improved Rack for Holding Milk-Pans; and I do hereby declare that the following is a full, clear, and exact description of the same, reference being had to the annexed drawings, making a part of this specification, in which—

Figure 1:
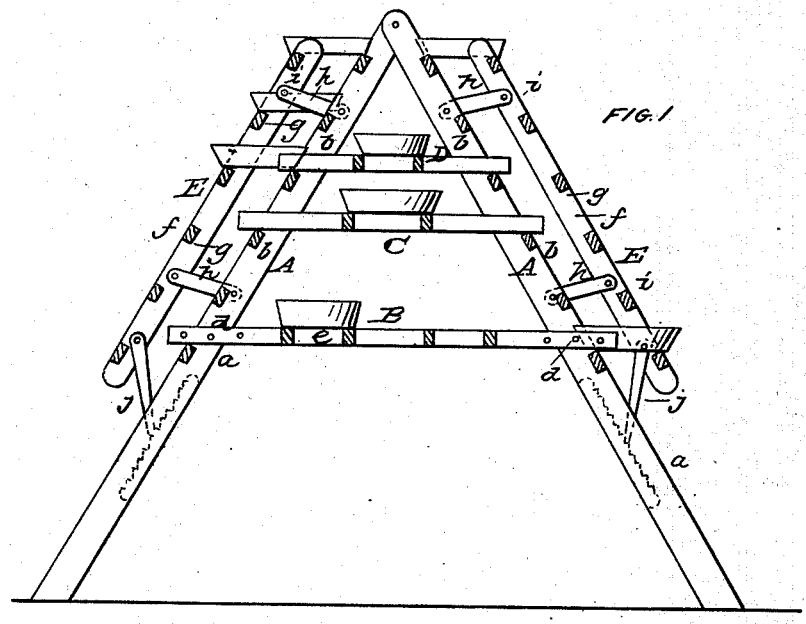
Figure 2:
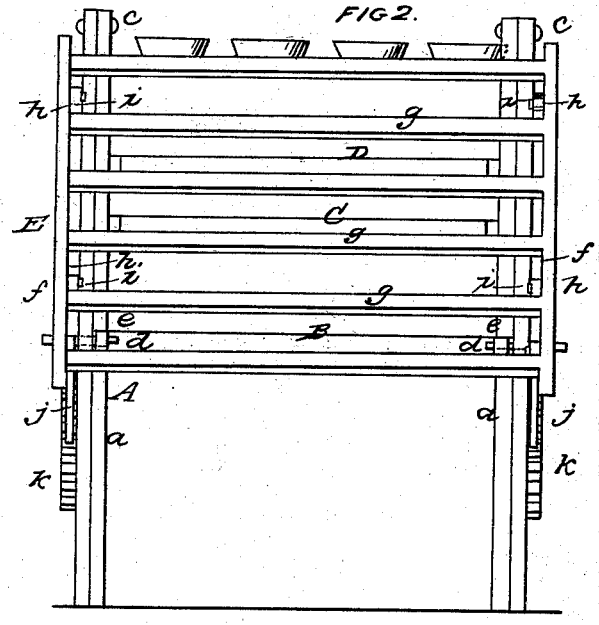

Figure 1, is an end sectional view of my invention. Fig. 2, is a side view of ditto.

Similar letters of reference indicate corresponding parts in the two figures.

The object of this invention is to obtain a rack for holding milk-pans that will be light, strong and durable, occupying but little space and still having a large holding capacity and better calculated for the intended purpose than any that have passed under my observation.

The invention consists in having two frames provided with horizontal parallel slats and connected by a joint at their upper ends, said frames being provided with horizontal slatted platforms and also with adjustable side frames, the whole being arranged, as hereinafter fully shown and described, so as to effect the desired object.

To enable those skilled in the art to fully understand and construct my invention I will proceed to describe it.

A, A, represent two frames which are formed each of two bars $a$, $a$, having horizontal slats $b$, attached at suitable distances apart. These frames are connected at their upper end by joints $c$. On the lower slats $b$, of the frames A, a slatted frame B, is placed, and the frames A, are secured in a more or less distended state by means of pins $d$, which pass through either of a series of holes in the sides $e$, of the frame B. Slatted frames C, D, may also be placed on the upper slats $b$, of the frames A, A.

To each frame A, a supplemental frame E, is attached. The frames E, are constructed similarly to the frames A, the former being each composed of two bars $f$, $f$, with horizontal slats $g$, secured to them. The frames E, E, are attached to the frames A, A, by short bars $h$, $h$, which are connected to both frames by joints $i$, to admit of a combined longitudinal and lateral adjustable movement of the frames E, toward and from the frames A, A. The frames E, E, are retained at any desired point within the scope of their movement by means of pawls $j$, which engage with racks $k$, that are attached to the bars $a$, of the frames A, A.

From the above description it will be seen that two rows of inclined slatted shelves will be formed one at each side of the rack, the slats $b$, $g$, of the frames A, E, forming the shelves. The milk pans are shown in red, and it will also be seen that the frames A, A, may be so adjusted that the heat and steam escaping from one pan of newly-set milk will not come in contact with the pan above it. The pans may be set in the rack empty and the milk strained into them; thus obviating the lifting of the milk in the pans and the liability of spilling the milk. The shelves may be made high or low as desired by simply drawing in or spreading out the frames A, A, and also made to occupy more or less space on the floor. When the device is not required for use, it may be folded compactly and put away in a very small space. The frames E, E, are adjusted to correspond with the position of the frames A, A, so that the slats $b$, $g$, may be kept in horizontal positions relatively with each other.

The frames may be wholly constructed of wood at least that would probably be the preferable material. The device may be constructed at a very small expense even when put together in a good workmanlike manner.

Having thus described my invention what I claim as new and desire to secure by Letters Patent, is:—

The employment or use of the frames A, A, connected by joints $c$, in connection with the supplemental frames E, E, and with or without the horizontal frames B, C, D, substantially as and for the purpose set forth.

GEORGE B. LEWIS.

Witnesses:
JOHN THOMPSON,
O. M. MITCHELL.